(12) United States Patent
Siddique et al.

(10) Patent No.: US 8,388,726 B2
(45) Date of Patent: Mar. 5, 2013

(54) PROCESSING COPPER SULFIDE ORES

(76) Inventors: Iffat Tahira Siddique, Lahore (PK); Izharul Haq Khan, Lahore (PK)

( * ) Notice: Subject to any disclaimer, the term of this patent is extended or adjusted under 35 U.S.C. 154(b) by 155 days.

(21) Appl. No.: 13/089,780

(22) Filed: Apr. 19, 2011

(65) Prior Publication Data

US 2012/0266723 A1   Oct. 25, 2012

(51) Int. Cl.
*C22B 15/00* (2006.01)
(52) U.S. Cl. ............................. 75/424; 75/743
(58) Field of Classification Search ............ 75/424
See application file for complete search history.

(56) References Cited

U.S. PATENT DOCUMENTS

| | | | | | |
|---|---|---|---|---|---|
| 2,049,470 | A | * | 8/1936 | Perkins | 209/166 |
| 2,205,194 | A | * | 6/1940 | Green | 209/167 |
| 4,579,589 | A | * | 4/1986 | Yuill et al. | 423/26 |

* cited by examiner

*Primary Examiner* — George Wyszomierski
*Assistant Examiner* — Tima M McGuthry Banks
(74) *Attorney, Agent, or Firm* — Sarfaraz K. Niazi

(57) ABSTRACT

Copper is chemically extracted from crude ores by first roasting it at temperature up to 500° C. for 90 minutes, then treating it with ammonium salt followed by leaching with sulfuric acid to obtain a soluble copper mass for further purification.

3 Claims, No Drawings

PROCESSING COPPER SULFIDE ORES

FIELD OF INVENTION

The invention relates to the chemical extraction of copper from copper sulfide ores by thermo-chemical methods, involving roasting with additive and acid leaching processing.

BRIEF DESCRIPTION OF INVENTION

Copper chemicals are used extensively in wood protection formulations, ship deck paints, and swimming pool chemicals due to their fungicidal and algaecide effects. Copper sulfate finds much application in industry. These are extracted from copper ores. The oxidized ores are easily leached and copper extracted by sulfuric acid leaching. The major ore minerals are in the form of sulfides, which cannot be leached without heating and roasting.

The instant invention uses novel chemicals as additive during roasting that allows decreasing the roasting temperature and enhancing the subsequent extraction of copper.

Normally, the copper ores are exploited and processed to produce a concentrate and copper metal by flotation process and pyrometallurgical techniques. No chemicals are produced from these ores, as they are sulfides and are not easily treatable with sulfuric acid. Direct roasting at 650° C. treats the sulfide ores containing chalcopyrite.

There remains an unmet need to develop a process for the utilization of copper ores for the preparation of copper chemicals with intent to enhance the extraction of copper from copper sulfide ores and to reduce the roasting temperature by use of additive making the process cheaper and more practical to operate.

DETAILS OF INVENTION

The instant invention provides an extremely simple and cost effective method that comprises a physical and a chemical processs. The physical methods consist of ore crushing, grinding, combining with an additive, heating, stirring, filtration, crystallization, and drying. The chemicals methods consist of ore roasting with additive, and leaching with dilute sulfuric acid.

EXAMPLE 1

50 Kg of crude ore was taken from the mine. It was subjected to primary crushing by jaw and rolls crusher and the ¼ inches material was ground in the ball mill to less than 150 meshes (100 microns). A sample batch of 2.0 Kg ore from the above step was taken and subjected to roasting using a gas-fired furnace. Ammonium chloride was mixed in batch as additive during roasting for 90 minutes. The material produced was treated with dilute sulfuric acid. Optimum condition used was 0.5 to 2.5% of sulfuric acid, which renders the copper mass soluble in short time. The leached solution was decanted after settling. Copper chemicals were produced by filtration, drying of solution and crystallization. Purification was conducted by re-dissolution and re-crystallization of the crystals.

EXAMPLE 2

A batch of 1-5 Kg mine waste was taken from ground mine waste. It was subjected to roasting with ammonium chloride in a gas-fired rotary furnace at temperature up to 500° C. in oxidizing flame for 90 minutes. The material produced was treated with dilute sulfuric acid in concentration of 0.5% to 2.5%. The solid liquid ratio was one to five. The leached solution was decanted after settling. Copper chemicals were produced by filtration, drying of solution and crystallization.

EXAMPLE 3

2 Kg of copper ore/concentrate was taken from ground mine waste and 0.2 Kg of ammonium chloride was mixed and subjected to roasting in a crucible in brick lined gas-fired furnace at temperature up to 500° C. The material was roasted for 90 minutes. The roasted material produced was ground and 10 liter of water was added and the slurry material stirred. Sulfuric acid was added to brig the pH to just below five. The solution was decanted after settling. Copper chemicals were produced by filtration, drying and crystallization. Purification was conducted by re-dissolution and re-crystallization of the crystals. Industrial chemicals of copper were produced by double decomposition, and displacement reactions etc. Solvent extraction was used to separate associated valuable salts.

What is claimed is:

1. A method for extracting copper from crude copper ore comprising:

Reducing said crude copper to a size ranging from 50-200 microns;

Adding to above said crude copper aluminum chloride equal in quantity to about 1/20 to 1/5 of the quantity of said crude ore;

Roasting above mixture at 450-600 C for 80-100 minutes;

Cooling down above mixture to room temperature;

Adding above mixture to a 0.25 to 3% sulfuric acid, hydrochloric acid or nitric acid solution in a ratio of one part above mixture to five parts of said sulfuric acid, hydrochloric acid or nitric acid solution;

Allowing above slurry to stand to leach for a period of 1-180 minutes;

Decanting the solution above slurry;

Filtering said decanted solution; and,

Drying said filtered decanted solution to crystallize copper.

2. The method of extracting copper of claim 1 wherein the percent of said copper extracted is above 80%.

3. The method of extracting copper of claim 1 wherein said crystallized copper is further extracted using a solvent.

* * * * *